US009906067B1

(12) United States Patent
Garrity et al.

(10) Patent No.: US 9,906,067 B1
(45) Date of Patent: Feb. 27, 2018

(54) APPARATUS, SYSTEM AND METHOD TO WIRELESSLY CHARGE/DISCHARGE A BATTERY

(71) Applicant: Garrity Power Services, LLC, Rockwall, TX (US)

(72) Inventors: Paul Garrity, Rockwall, TX (US); Aaron Jungreis, Ra'anana (IL)

(73) Assignee: Garrity Power Services LLC, Rockwall, TX (US)

(*) Notice: Subject to any disclaimer, the term of this patent is extended or adjusted under 35 U.S.C. 154(b) by 204 days.

(21) Appl. No.: 14/754,863

(22) Filed: Jun. 30, 2015

(51) Int. Cl.
H02J 7/00 (2006.01)
H02J 7/02 (2016.01)
H02J 7/04 (2006.01)

(52) U.S. Cl.
CPC ............... H02J 7/025 (2013.01); H02J 7/04 (2013.01)

(58) Field of Classification Search
CPC .. Y02E 60/12; H02J 7/025; H02J 7/04; H01F 38/14; Y02T 90/122; B60L 11/182
USPC .......................................................... 320/108
See application file for complete search history.

(56) References Cited

U.S. PATENT DOCUMENTS

| 3,944,904 | A | * | 3/1976 | Hase | ........................ | H02J 7/008 |
| | | | | | | 320/146 |
| 5,633,577 | A | | 5/1997 | Matsumae et al. | | |
| 5,637,913 | A | | 6/1997 | Kajihara et al. | | |
| 6,803,744 | B1 | * | 10/2004 | Sabo | ........................ | H02J 7/025 |
| | | | | | | 307/104 |
| 9,490,521 | B2 | | 11/2016 | Bokenfohr et al. | | |
| 2007/0035883 | A1 | | 2/2007 | Katcha et al. | | |
| 2009/0102590 | A1 | | 4/2009 | Rhodes et al. | | |
| 2010/0148723 | A1 | * | 6/2010 | Cook | ................... | G06K 7/0008 |
| | | | | | | 320/108 |
| 2011/0164437 | A1 | * | 7/2011 | Sun | .................... | H02M 3/33569 |
| | | | | | | 363/16 |
| 2011/0221387 | A1 | * | 9/2011 | Steigerwald | .......... | B60L 11/182 |
| | | | | | | 320/108 |
| 2012/0169137 | A1 | | 7/2012 | Lisi et al. | | |
| 2012/0235636 | A1 | | 9/2012 | Partovi | | |
| 2013/0271144 | A1 | | 10/2013 | Avdievich et al. | | |
| 2014/0027153 | A1 | | 1/2014 | Harwath | | |
| 2014/0084862 | A1 | * | 3/2014 | Kawaguchi | ........... | B60L 11/005 |
| | | | | | | 320/108 |
| 2014/0097790 | A1 | * | 4/2014 | Yeh | ........................ | H02J 7/0029 |
| | | | | | | 320/108 |
| 2014/0125276 | A1 | * | 5/2014 | Lampinen | ................ | H02J 5/005 |
| | | | | | | 320/108 |
| 2014/0139036 | A1 | | 5/2014 | Shijo et al. | | |
| 2014/0139178 | A1 | * | 5/2014 | Large | ..................... | H02J 7/0044 |
| | | | | | | 320/108 |
| 2014/0375260 | A1 | * | 12/2014 | Janssen | ................... | H01F 38/14 |
| | | | | | | 320/108 |

(Continued)

Primary Examiner — Yalkew Fantu
Assistant Examiner — Mohammed J Sharief
(74) Attorney, Agent, or Firm — Boisbrun Hofman, PLLC

(57) ABSTRACT

An apparatus, system and method to wirelessly charge and/or discharge a battery. In one embodiment, the apparatus includes a removable first magnetic core piecepart having a surrounding first metallic coil and configured to be coupled to and aligned with a second magnetic core piecepart having a surrounding second metallic coil to form a transformer. The apparatus also includes a battery metallically coupled to the first metallic coil and configured to be charged and discharged through an electrically isolating path of the transformer.

20 Claims, 11 Drawing Sheets

(56) References Cited

U.S. PATENT DOCUMENTS

| | | | | |
|---|---|---|---|---|
| 2015/0124412 A1* | 5/2015 | Keegan | ............... | H02M 7/5387 |
| | | | | 361/734 |
| 2015/0333797 A1* | 11/2015 | Nejatali | ............... | H04B 5/0043 |
| | | | | 375/376 |
| 2015/0380978 A1* | 12/2015 | Toivola | ................... | H02J 7/025 |
| | | | | 320/108 |

* cited by examiner

APPARATUS, SYSTEM AND METHOD TO WIRELESSLY CHARGE/DISCHARGE A BATTERY

TECHNICAL FIELD

The present invention is directed, in general, to wireless power transmission and, more specifically, to an apparatus, system and method to wirelessly charge and/or discharge a battery.

BACKGROUND

A consideration in the design of consumer products is the use of a rechargeable battery to provide adequate, reliable, and unconstrained power to a consumer device. Up until about 20 years ago, most electrically powered consumer devices were simply coupled to the utility power grid. Rechargeable batteries saw limited use because earlier battery technology allowed only a very limited number of charging cycles with limited charging efficiency.

With the adoption of lithium-based batteries that allow for a large number of charge/discharge cycles, rechargeable batteries began to see increasing use for consumer electronics applications, facilitating the proliferation of electronic devices without tethering to the utility grid. Despite the great advantage of allowing consumers to use electronic devices such as cellular phones, tablets, and laptop computers, the battery operated electronic devices still needed to be connected to the utility grid to recharge the batteries.

In recent years, wireless power systems have been developed that allow recharging of the batteries without making a physical connection between the battery and the charger. The wireless power systems use resonant operation to transfer power from a charger to a battery. The battery itself is electrically/metallically tied to the load it will eventually power and charging is accomplished through a metallically isolated wireless interface. There are many reasons that the battery has been electrically/metallically tied to the load it operates including that both power transfer and communication in standard wireless interfaces is set up to allow transfer of power in only one direction. Additionally, standard wireless power interfaces are inefficient, so too much battery life would be lost by driving an electronic device through a wireless interface.

Standard wireless interfaces also require post regulators such as linear regulators because the control loop through a wireless interface is too slow for the wireless battery interface to adequately regulate the output of the battery. This regulator presents a further impediment to processing power in both directions. Wireless interfaces also tend to be very limited in power, both because of poor coupling efficiency and because of the heat generated by the poor coupling for any appreciable levels of power. The poor coupling efficiency of wireless power systems also produces a loss in the voltage that can be produced by a system component, which causes a mismatch in the voltage that could be wirelessly produced by the battery compared with the voltage necessary to wirelessly charge the battery.

There are many advantages associated with a battery that can be wirelessly charged or discharged, that is, one which interfaces wirelessly over a metallically isolated path for both charging and discharging. What is needed in the art, therefore, is a power system that can wirelessly charge a battery that overcomes the deficiencies in the prior art.

SUMMARY OF THE INVENTION

These and other problems are generally solved or circumvented, and technical advantages are generally achieved, by advantageous embodiments of the present invention, including an apparatus, system and method to wirelessly charge and/or discharge a battery. In one embodiment, the apparatus includes a removable first magnetic core piecepart having a surrounding first metallic coil and configured to be coupled to and aligned with a second magnetic core piecepart having a surrounding second metallic coil to form a transformer. The apparatus also includes a battery metallically coupled to the first metallic coil and configured to be charged and discharged through an electrically isolating path of the transformer.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

Figure 1:
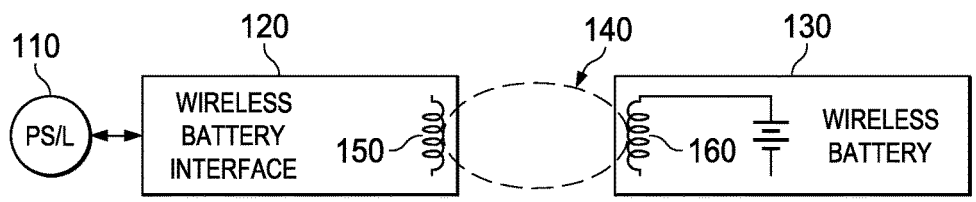
FIG. 1 illustrates a block diagram of an embodiment of a power system with a wireless battery interface and a wireless battery.

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, an apparatus, system and method to wirelessly charge and/or discharge a battery. The power system will be described as a switched-mode power supply or power converter. Any application that may benefit from a wireless battery charged and discharged by a wireless battery interface is well within the broad scope of the present invention. Additionally, while the principles of the present invention will be described with respect to electronic devices (also referred to as a "load") such as cell phones, tablets, and power tools, other applications are well within the broad scope of the present invention.

In the environment of a conventional charging system with a cordless power tool or other battery operated electronic device, a battery is attached to low-voltage dc electrical connector that is formed with two metallic contacts. A load (or the battery operated electronic device) is attached to the low-voltage dc electrical connector that is formed with the two metallic (galvanic) contacts. A charger is connected to the utility grid and also to the low-voltage dc electrical connector that contains the two metallic contacts. A battery is metallically connected to the charger to charge the battery. To use the battery with the load, the battery is removed from the charger and is then metallically coupled to the load. Removing the battery from one device (e.g., the charger) and connecting it to another device (e.g., the load) requires breaking and then reconnecting metallic electrical contacts.

The terms "metallic and "galvanic" generally refer to, without limitation, an electrical connection between separate parts that is a wired or a contact that may include electrically conductive components such as semiconductor devices as well as current-conducting components such as resistors and inductors. Such wired connections conduct a current that may exceed a safety limit in response to an applied voltage difference across the ends of the electrical connection.

A battery-charging arrangement as set forth above allows a single rechargeable battery to be used by different battery operated electronic devices. A drawback of such a system is that the battery is configured with exposed electrical metallic contacts. The metallic contacts present several limitations such as the battery-charging arrangement is limited to environments that will not corrode the contacts. If exposed to a conductor, the metallic contacts can create a short circuit across the battery that can generate a dangerous amount of heat as well as destroy the battery. Also, a voltage of the battery-charging arrangement is limited to low voltages to address safety issues. All battery operated electronic devices that interface with the battery must be designed to operate at the same voltage as the battery.

In cases where the battery is removed from the charger and connected to a load for a large number of cycles, the electrical contacts can wear and eventually degrade the connection. The limitations of such conventional battery-charging arrangements could be overcome if the electrical metallic contacts were replaced with a system to transmit power wirelessly.

A disadvantage of the conventional wireless battery systems is poor power transfer efficiency. Another disadvantage is a slow feedback loop that necessitates the use of a post regulator such as a linear regulator. Still another disadvantage is the need to galvanically couple the battery to the load, thus making it difficult to remove the battery without breaking a metallic electrical contact. A further disadvantage is that the power flow to the battery is unidirectional, that is, the battery can be wirelessly charged, but the discharge occurs through a directly wired electrical connection.

In conventional battery charging arrangements using magnetic devices (e.g., a transformer), transmit and receive coils (or windings) of the transformer are coupled through a common flux path including air or other substance of equivalent magnetic permeability. This creates a substantial amount of loss due to poor magnetic flux coupling, and the resulting power transfer efficiency of the conventional wireless battery power system is typically only on the order of 50 percent. The substantially poor magnetic flux coupling of the conventional wireless battery power system makes it difficult to discharge the battery through a wireless path since the battery charging takes place at a much slower rate than discharging the battery into a load. The poor magnetic flux coupling further prevents voltage matching of the charging and discharging cycles. The conventional battery charging arrangements also prevents a bidirectional power flow to and from the battery.

The power system as introduced herein provides the safety advantages and voltage scaling of a wireless power system, while preserving the efficiency and bidirectional power flow obtained by the metallic contact battery power systems. The power system set forth herein eliminates the metallic contacts, thereby avoiding the concern with the corrosion of standard battery contacts. The wireless interface can be customized for any voltage interface. This allows batteries with any amount of energy storage to be standardized to produce a same voltage. High-voltage battery strings can be safely interfaced to other electronic devices. A single wireless battery can interface with many electronic devices that would traditionally require dc voltages different from that of the battery string. The nonmetallic power interface as described herein can efficiently transfer power for an electronic device in both directions to regulate an output characteristic (e.g., an output voltage), and obviate the need for a post regulator regardless of the direction of power transfer.

Turning now to FIG. 1, illustrated is a block diagram of an embodiment of a power system (also referred to as a "system") with a wireless battery interface 120 and a wireless battery 130. A power source/load 110 such as a utility grid power source or a power tool is electrically coupled (i.e., wired) to the wireless battery interface 120. The wireless battery 130 is docked into the wireless battery interface 120 by a coupler. The coupler links a magnetic field 140 induced by a metallic coil (or winding) 150 surrounding a wireless battery interface magnetic core piecepart in the wireless battery interface 120 with a wireless battery magnetic core piecepart in the wireless battery 130. When charging the wireless battery 130, a voltage is induced in a metallic coil (or winding) 160 surrounding the wireless battery magnetic core piecepart in the wireless battery 120 by a voltage impressed across the terminals of the metallic coil 150 that surrounds the wireless battery interface magnetic core piecepart in the wireless battery interface 120. When discharging the wireless battery 130, a voltage is induced in the metallic coil (or winding) 150 surrounding the wireless battery interface magnetic core piecepart in the wireless battery interface 120 by a voltage impressed across the terminals of the metallic coil 160 that surrounds the wireless battery magnetic core piecepart in the wireless battery 130. The power source/load 110 can be, for instance, a utility grid power source that is employed to charge the wireless battery 130, and also can be arranged to absorb energy from the wireless battery 130 for utility grid power source load-leveling purposes. It should be understood that the connection between the metallic coil 160 and battery will include components therebetween.

Figure 2:
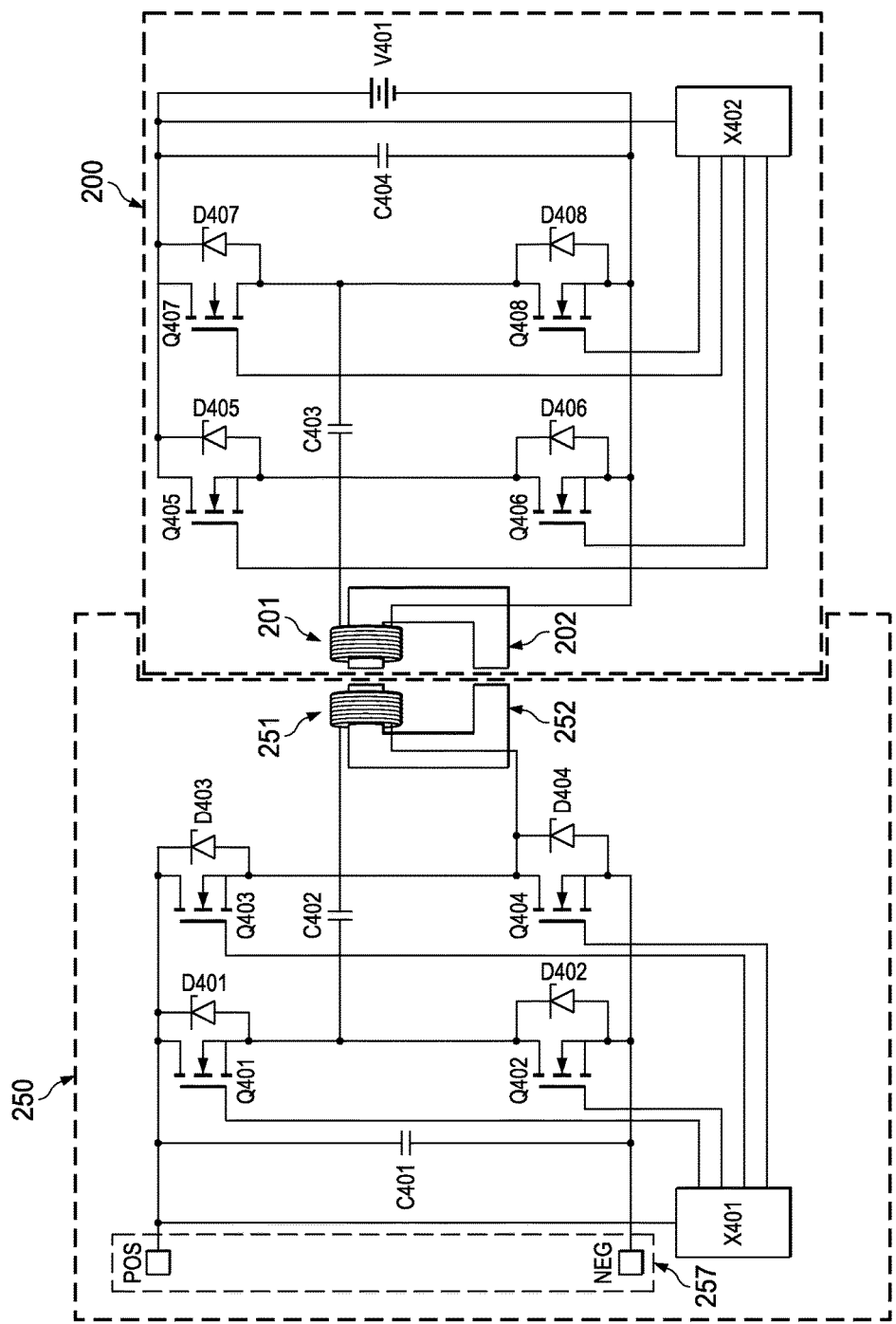
FIG. 2 illustrates a schematic diagram of an embodiment of a power system with a wireless battery and a wireless battery interface.

Turning now to FIG. 2, illustrated is a schematic diagram of an embodiment of a power system with a wireless battery 200 and a wireless battery interface 250. The wireless battery 200 is formed with a metallic coil 201 surrounding a wireless battery magnetic core piecepart 202 that can be used to both transmit and receive power. The wireless battery magnetic core piecepart 202 is typically composed of, without limitation, a soft ferrite, powered iron, or some other ferromagnetic substance with high magnetic permeability.

The metallic coil 201 is coupled to a resonant capacitor C403 and a full-bridge power train is formed with power switches (e.g., metal-oxide semiconductor field-effect transistors ("MOSFETs")) Q405, Q406, Q407, Q408 and diodes D405, D406, D407, D408 in anti-parallel with each respective power switch. In other words, each diode D405, D406, D407, D408 is oriented in the same direction as the body (intrinsic) diode of the corresponding power switch Q405, Q406, Q407, Q408. The addition of the diodes D405, D406, D407, D408 reduces the voltage drop across the corresponding power switch Q405, Q406, Q407, Q408 and allows for higher switching speeds for the power train. Of course, the diodes D405, D406, D407, D408 may be omitted if the body diodes of the power switch Q405, Q406, Q407, Q408 can perform the intended task with the desired performance. The term "switch" generally refers to any active semiconductor device such as, without limitation, a MOSFET or bipolar transistor or a passively switched semiconductor device such as a diode.

The full-bridge power train formed with power switches Q405, Q406, Q407, Q408 is coupled to a capacitor C404 and a rechargeable battery (or battery) V401. The capacitor C404 filters high-frequency current to provide a steady voltage to or from the battery V401. The capacitor C404 may not be needed in all applications because the battery V401 can also act as a filter.

The wireless battery interface 250 is formed with a metallic coil 251 surrounding a wireless battery interface magnetic core piecepart 252 that can be used to both transmit and receive power. The wireless battery interface magnetic core piecepart 252 is typically constructed with a soft ferrite, powered iron, or some other ferromagnetic substance. The magnetic core pieceparts 202, 252 link most of the magnetic flux that passes between the metallic coils 201, 251. There is a small air gap in the magnetic path created by the magnetic core pieceparts 202, 252. The air gap is typically due to the enclosures of the wireless battery 200 and the wireless battery interface 250. In practice, however, the air gaps can be kept quite small such as 3 or 4 millimeters ("mm"). It would be advantageous to maintain the air gaps to be smaller than about 1.5 times the square-root of the cross-sectional area of the magnetic core pieceparts 202, 252 to reduce (e.g., minimize) fringing of the magnetic flux. The magnetic core pieceparts 202, 252 with the corresponding metallic coils 201, 251 form a transformer of the power system.

The power system illustrated in FIG. 2 demonstrates one of many ways that the magnetic core pieceparts 202, 252 can be designed to create a flux path that passes through the metallic coils 201, 251. The metallic coil 251 is coupled to a resonant capacitor C402 and a full-bridge power train is formed with power switches Q401, Q402, Q403, Q404 and diodes D401, D402, D403, D404 in anti-parallel with each respective power switch. In other words, each diode D401, D402, D403, D404 is oriented in the same direction as the body (intrinsic) diode of the corresponding power switch Q401, Q402, Q403, Q404. The addition of the diodes D401, D402, D403, D404 reduces the voltage drop across the corresponding power switch Q401, Q402, Q403, Q404 and allows for higher switching speeds for the power train. Of course, the diodes D401, D402, D403, D404 may be omitted if the body diodes of the power switch Q401, Q402, Q403, Q404 can perform the intended task with the desired performance.

The full-bridge power train formed with the power switches Q401, Q402, Q403, Q404 is coupled to a capacitor C401 and terminals 257 including a positive terminal POS and a negative terminal NEG. The capacitor C401 filters high-frequency current to provide a steady voltage to or from the terminals 257. The terminals 257 can be connected to either a power source or a load depending on whether the battery V401 is charging or discharging, respectively. The power source may be, for example, a power converter that regulates voltage from a utility grid such as a power-factor corrected power converter. The power source may also be a battery or a dc voltage source connected to a universal serial bus ("USB") power port. There are many possibilities for a load including, without limitation, a string of light-emitting diodes ("LEDs"), a battery, or a power converter that pushes power into or receives power from the utility grid. The terminals 257 may connect to a power source or load within the same enclosure as the wireless battery interface 250. For instance, a power converter may be located in the same enclosure as the wireless battery interface 250 and have electrical connections leading to an external load or power source. Of course, a portion of or all of the power source or load can be located external to the enclosure of the wireless battery interface 250. Many implementations are possible as would occur to one skilled in the art.

The power system illustrated in FIG. 2 can process power from the terminals 257 to the battery V401 or from the battery V401 to the terminals 257. If transmitting power from the terminals 257 to the battery V401, the full-bridge power train formed with the power switches Q401, Q402, Q403, Q404 produces a pulsed voltage waveform to the resonant capacitor C402 and the metallic coil 251. The full-bridge power train is switched so that the power switches Q401, Q404 are simultaneously turned on and off with a duty cycle slightly less than about 50 percent (such as 45 to 49 percent). Also, the power switches Q402, Q403 are simultaneously turned on and off with a duty cycle slightly less than 50 percent and 180 degrees out-of-phase with respect to the power switches Q401, Q404. The duty cycle of each power switch is slightly less than 50 percent to decrease a possibility of simultaneous conduction with an opposing power switch and to allow enough time for a magnetizing current in the metallic coil 251 to resonate with the parasitic capacitance of the power switches Q401, Q402, Q403, Q404 to commutate a voltage thereacross. This process results in soft-switching, meaning the voltage across or the current through each power switch Q401, Q402, Q403, Q404 is naturally resonated to substantially zero just prior to turning that respective power switch on or off.

For cases in which the wireless battery interface 250 is used as a battery charger, it is also possible to configure a controller X401 to turn off the power switch Q403 and turn on the power switch Q404 continuously. As a result, the full-bridge power train formed with the power switches Q401, Q402, Q403, Q404 will act as a half-bridge power train with the resonant capacitor C402 absorbing a dc offset caused by half-bridge operation. Reverting from a full-bridge to a half-bridge power train may be useful, for example, when a charging circuit connected to the terminals 257 switches connection from a 115 Vac utility grid power source to a 230 Vac utility grid power source since a half-bridge configuration will transmit only half as much voltage as a full-bridge configuration. The controller X401 can therefore be configured to selectively cause at least a portion of the power train to switch between full-bridge and half-bridge operation in response to a sensed voltage level (e.g., the voltage at the terminals 257).

A pulsed voltage that appears across the metallic coil 251 induces a voltage across the metallic coil 201 that is scaled by a transformer turns ratio of the metallic coils 201, 251. The voltage across the metallic coil 201 appears across the resonant capacitor C403 in series with the full-bridge power train formed with the power switches Q405, Q406, Q407, Q408. The diodes D405, D406, D407, D408 rectify the pulsed voltage that appears across the metallic coil 201 and the resonant capacitor C403 and the resulting power is sent to the battery V401. The power switches Q405, Q406, Q407, Q408 may be turned on during some or all of the time that the corresponding diodes D405, D406, D407, D408 are conducting to reduce conduction losses therein.

If the power system illustrated in FIG. 2 transmits power from the battery V401 to the terminals 257, the process as described above is reversed. That is, a controller X402 drives the full-bridge power train formed with the power switches Q405, Q406, Q407, Q408 to produce a pulsed voltage across the resonant capacitor C403 and the metallic coil 201. The induced voltage in the metallic coil 251 is then rectified by the diodes D401, D402, D403, D404 to send power to the terminals 257. Accordingly, the resonant capacitors C402, C403 in conjunction with the metallic coils 201, 251 and the full-bridge power trains form a resonant topology.

Figure 3:
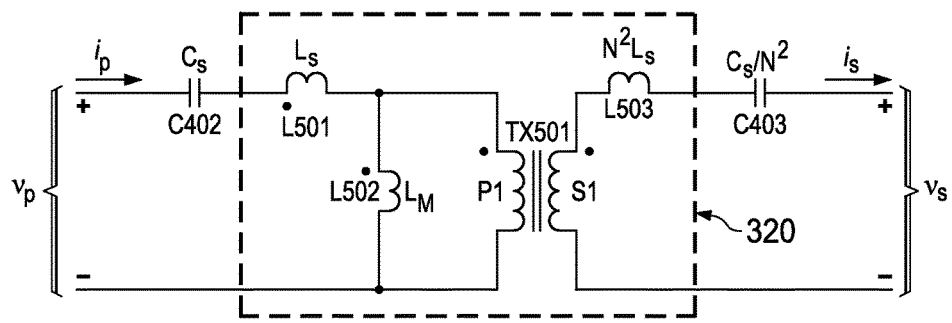
FIGS. 3 and 4 illustrate schematic diagrams of embodiments of a model of the transformer of FIG. 2.
Figure 4:
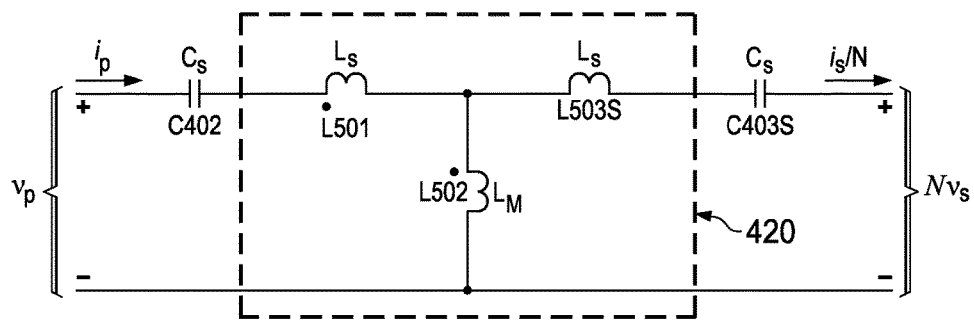

Turning now to FIGS. 3 and 4, illustrated are schematic diagrams of embodiments of a model of the transformer of FIG. 2. The magnetic core pieceparts 202, 252 with corresponding metallic coils 201, 251 of FIG. 2 are modelled as a transformer 320. The transformer 320 is formed with inductors L501, L502, L503 and an ideal transformer TX501. The ideal transformer TX501 represents an ideal transformer with no leakage inductance and infinite magnetizing inductance. The actual leakage inductance caused by non-ideal coupling between the metallic coils 201, 251 is modelled by the inductors L501, L503. The magnetizing inductance of the transformer 320 is modelled by the inductor L502. The system galvanic isolation and turns ratio is modelled by the transformer 320. The turns ratio N of the ideal transformer TX501 equals S1/P1. The leakage inductance of the transformer 320 is naturally split between the two sides of the ideal transformer TX501 such that the ratio between the inductance of the inductors L501, L503 is $N^2$. If the inductance of the inductor L501 is $L_s$, then the inductance of the inductor L503 is $N^2 L_s$. The capacitance values for the resonant capacitors C402, C403 should preferably be chosen to obtain the same ratio of impedance as the inductances for the inductors L501, L503. So, if the resonant capacitor C402 has a capacitance $C_s$, then the resonant capacitor C403 should be chosen with a value $C_s/N^2$. The input to the transformer 320 has a voltage $v_p$ across the input terminals and a current $i_p$ enters the top terminal. The output of the transformer 320 has voltage $v_s$ and current $i_s$.

For the purposes of analysis only, the galvanic isolation barrier can be removed from the circuit in FIG. 3 resulting in the diagram of FIG. 4. In FIG. 4, a circuit block 420 models a transformer and replaces the transformer 320 from FIG. 3. In FIG. 4, the inductors L501, L502, and the resonant capacitor C402 are the same as the correspondingly numbered components illustrated in FIG. 3. The inductor L503S and the resonant capacitor C403S have been appropriately scaled translated to the other side of the circuit block 420. Furthermore, the output voltage and current are scaled by the transformer turns ratio to $Nv_s$ and $i_s/N$, respectively, as illustrated in FIG. 4.

With continuing reference to FIGS. 3 and 4, an advantageous mode of operation of the power system illustrated in FIG. 2 is a dc transformer mode of operation. In the dc transformer mode of operation, the full-bridge power train on the transmitting side is driven at the resonant frequency of the resonant capacitor C402 and the inductor L501. The resonant frequency of the resonant capacitor C402 and the inductor L501 is:

$$f_{res} = \frac{1}{2\pi\sqrt{C_s L_s}}.$$

The resonant frequency of the inductor L503S and the resonant capacitor C403S is the same as that of the resonant capacitor C402 and the inductor L501. As a result, when driving power switches at the resonant frequency, the circuit block 420 of FIG. 4 can be simplified to a parallel inductor $L_M$ with the voltage and current at the battery scaled by the factor N. The magnetic structure thus acts like a dc transformer in parallel with an inductor. Operating in dc transformer mode of operation is possible because the magnetic core pieceparts 202, 252 provide consistent and tight coupling between the metallic coils 201, 251 illustrated in FIG. 2.

In practice, the driving frequency is usually slightly lower than the resonant frequency of the resonant capacitor C402 and the inductor L501 because the diode bridge (the diodes D405, D406, D407, D408) of the wireless battery 200 prevents the resonant current from continuing to flow after the current in the wireless battery 200 passes through zero, thereby allowing a window of driving frequency over which the power system will behave like a dc transformer. That is, the voltages $v_p = Nv_s$ for a small range of frequencies are at and above the resonant frequency. The ratio of output voltage to input voltage is independent of load current and remains a fixed ratio that is the same as the ratio of turns in the metallic coils 201, 251. The resonant capacitors C402, C403 can thus be selected to produce substantially zero-current switching of a switching circuit of the power train in conjunction with at least one inductor (e.g., an inductor L501, L502, L503 representing the inductances of the transformer 320). The inductor(s) can be formed at least in part with a metallic coil of a transformer.

Figure 5:
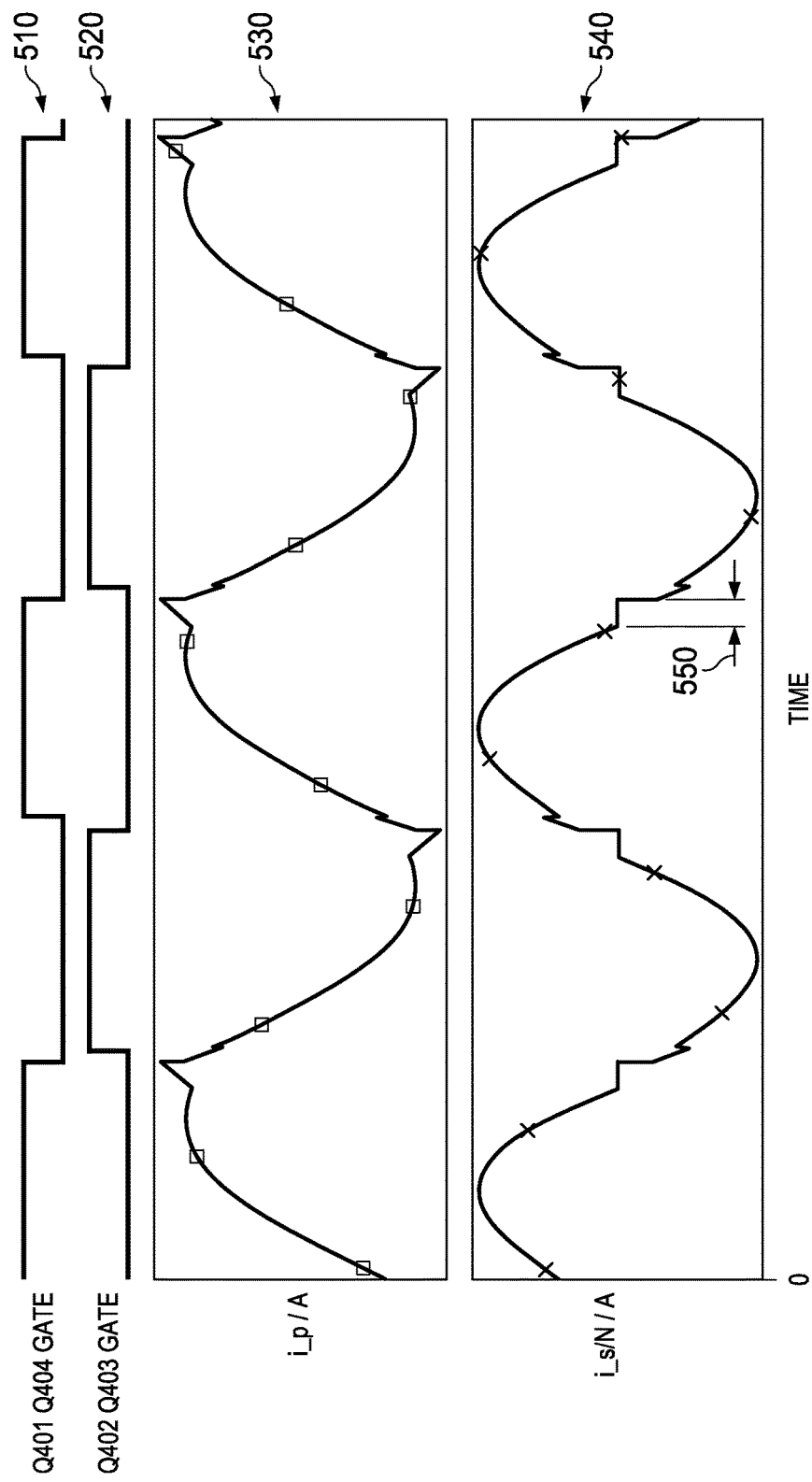
FIGS. 5 and 6 illustrate graphical representations of waveforms demonstrating an embodiment of a dc transformer mode of operation of the power system of FIG. 2.
Figure 6:
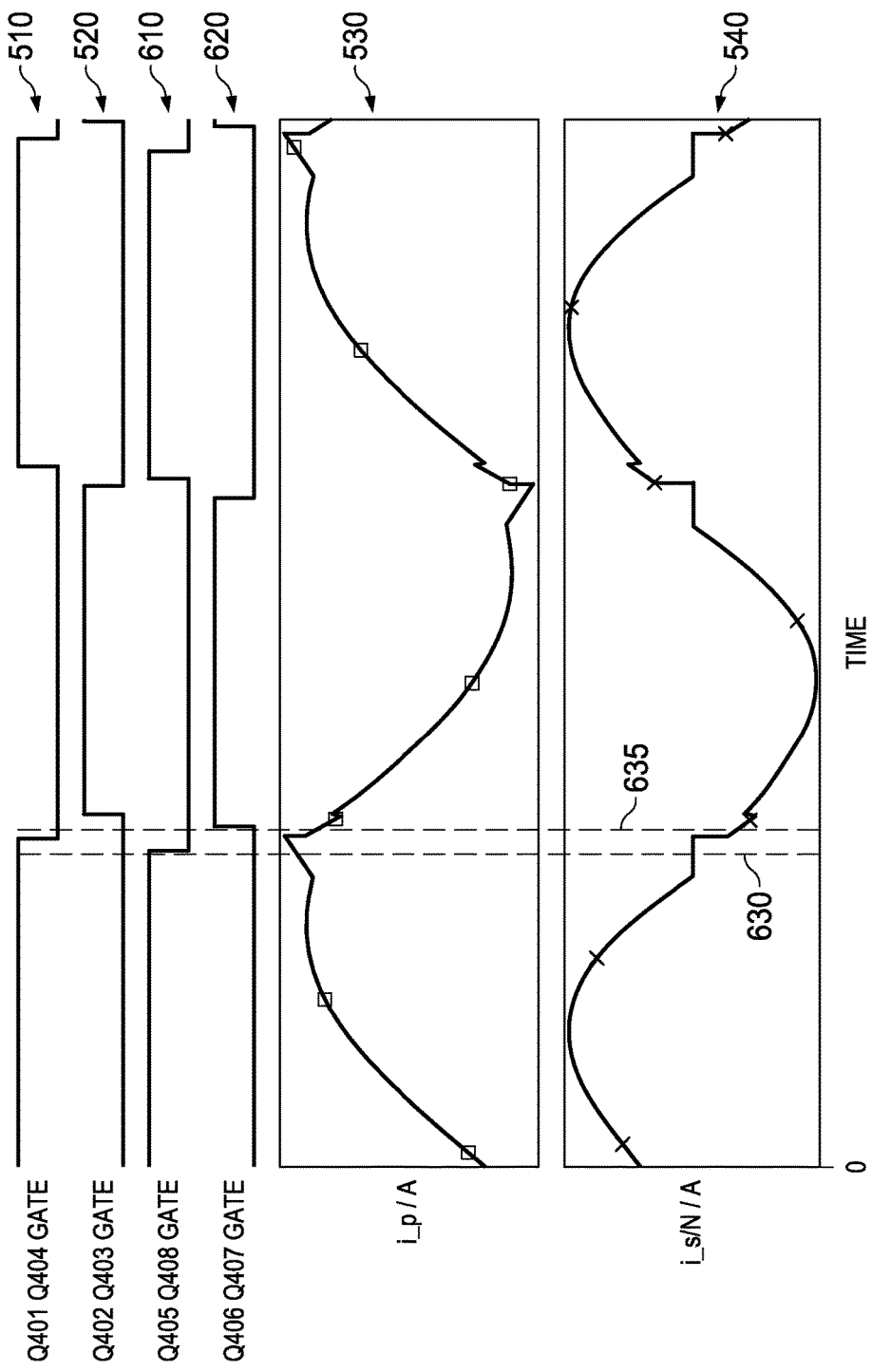

Turning now to FIGS. 5 and 6, illustrated are graphical representations of waveforms demonstrating an embodiment of a dc transformer mode of operation of the power system of FIG. 2. In the dc transformer mode of operation, the current in the power system resembles a sequence of half sinusoids as shown by the waveforms in FIG. 5. The first waveform 510 in FIG. 5 represents gate drive signals for the power switches Q401, Q404. The second waveform 520 represents gate drive signals for the power switches Q402, Q403. The third waveform 530 represents the current $i_p$ as illustrated in FIGS. 3 and 4. The fourth waveform 540 represents the current $i_s/N$ as illustrated in FIG. 4. The sequence of half-sinusoid current waveforms allows for efficient control of the power switches of the full-bridge power train while avoiding (or at least reducing) the possibility of a shoot-through because, as can be seen by time interval 550 in FIG. 5 (the dead-time), the resonant current in the wireless battery 200 goes to zero for a short period of time prior to switching polarity. This dead-time occurs because the diodes D405, D406, D407, D408 substantially prevent reverse current from flowing. As long as the switching frequency of the power switches Q401, Q402, Q403, Q404 is slightly higher than the resonant frequency, the current $i_s/N$ will reach zero before the alternate conduction of the power switches of the full-bridge power train is enabled, as can be seen by the timing of the gate drive signals for the power switches Q401, Q402, Q403, Q404 with respect to the time interval 550.

FIG. 6 superimposes the gate drive signals for the power switches Q405, Q406, Q407, Q408 of the wireless battery 200 of FIG. 2 in addition to the waveforms introduced in FIG. 5. The first new waveform 610 in FIG. 6 represents gate drive signals for the power switches Q405, Q408, and the second new waveform 620 represents gate drive signals for the power switches Q406, Q407. At a time 630, shortly after the current $i_s/N$ has fallen to zero, the power switches Q405, Q408 gates are switched off. At a time 635, just after the current $i_s/N$ goes negative, the power switches Q406, Q407 are turned on. The controller X402 for the wireless battery 200 controls the conduction periods of the power switches Q405, Q406, Q407, Q408 by monitoring the current $i_s/N$. The current $i_s/N$ in FIG. 4 is analogous to the current $i_s$ through the resonant capacitor C403 in FIGS. 2 and 3.

If the gate drive signals for the respective full-bridge power trains of the wireless battery 200 and the wireless battery interface 250 are synchronized, another advantage occurs above that of merely reducing conduction and/or switching losses due to diode voltage drops and diode recovery times. If the receiving side full-bridge power train (e.g., the wireless battery power train) is driven at the same frequency as that of the wireless battery interface 250, then the wireless battery 200 can function as a wireless battery interface 250 with no change of operation, thereby allowing power flow into or out of the wireless battery 200 to instantly switch direction with no change to the gate drive signals (or duty cycle thereof) of the full-bridge power trains. The roles of wireless battery 200 and wireless battery interface 250 can thus be switched very quickly without concern for response times of control loops. In fact, no voltage control is needed at all in the dc transformer mode of operation provided the wireless battery interface 250 and the wireless battery 200 operate at fixed voltage levels. The power system of FIG. 2 thus behaves like an actual battery in its ability to both charge and discharge through the same two terminals without any significant change to its voltage level.

The addition of a bidirectional dc converter (such as a half-bridge with an inductor tied to the switching point of the half-bridge) to either the battery V401 or at the terminals 257 can provide the necessary regulation when the wireless battery interface 250 or wireless battery 200 does not operate at a fixed voltage level. It is thus possible to use the power system of FIG. 2 in applications that allow the battery V401 to be successively charged and discharged without changing a duty cycle of the power trains. Examples of such applications would include using the battery V401 for load leveling of a utility grid or using the battery V401 to provide peak load demands. So, for example, if a distributed generation plant provided power to a varying load, the battery V401 could switch between charging mode when the load was below the capacity of the distributed generation plant, and the battery V401 could discharge when the load exceeded the capacity of the distributed generation plant.

Thus, the dc transformer mode of operating the power system of FIG. 2 has several advantages. For instance, the voltage between the wireless battery interface 250 and the wireless battery 200 is held in a substantially fixed and predictable ratio regardless of the load, thereby obviating the need for a voltage regulation loop. Also, the diode rectifier losses are reduced. Moreover, the wireless battery 200 can instantly change mode of operation to a wireless battery interface 250 to allow quick change of power flow direction without any communication signals sent between the two wireless components and thus causing the power system to act like a battery with galvanically isolated terminals.

Another mode of operation that allows the possibility of reduced switching losses is a pulsed boost mode of operation or boost mode of operation. The boost mode of operation is employable with a single direction of power flow for any given control loop. Reversing the power flow is more easily accomplished in this mode of operation by an external input to a controller, for example, by use of a push-button switch. While the boost mode of operation is more difficult to control than the dc transformer mode of operation, the boost mode of operation presents the possibility of reduced switching losses as well as the possibility of fast voltage regulation, both boosting and reducing the voltage at the wireless battery 200 compared to that of the wireless battery interface 250.

Referring again to FIGS. 3 and 4, in the boost mode of operation, the power system is driven at a frequency far below that of the resonant frequency $f_{res}$ of the inductor L501 and the resonant capacitor C402, but above the lower resonant frequency of the power system which occurs at:

$$f_{lres} = \frac{1}{2\pi\sqrt{C_s(L_s + L_M)}}.$$

By driving the full-bridge power train of the transmitting system far below the resonant frequency $f_{res}$ but above the lower resonant frequency $f_{lres}$, the power system is able to obtain a voltage gain because it operates as a cross between a series resonant and a parallel resonant system. While the series resonant system cannot achieve any voltage gain, the parallel resonant system can achieve very high voltage gain.

Figure 7:
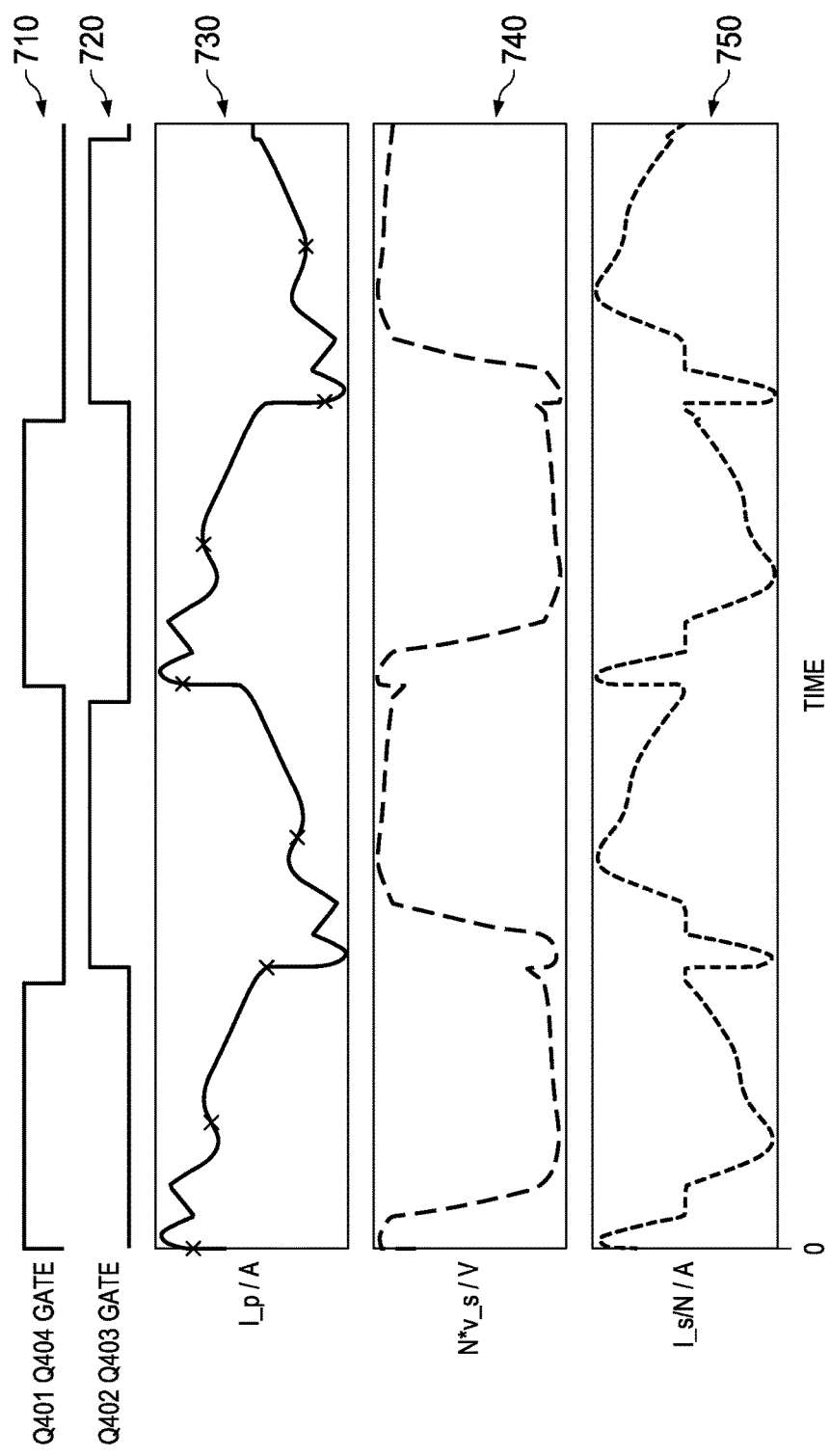
FIG. 7 illustrates a graphical representation of waveforms demonstrating an embodiment of a boost mode of operation of the power system of FIG. 2.

Turning now to FIG. 7, illustrated is a graphical representation of waveforms demonstrating an embodiment of a boost mode of operation of the power system of FIG. 2. When operating in a boost mode, it is possible to choose a frequency of operation that reduces (e.g., minimizes) switching losses as shown in FIG. 7. The first waveform 710 in FIG. 7 represents gate drive signals for the power switches Q401, Q404. The second waveform 720 represents gate drive signals for the power switches Q402, Q403. The third waveform 730 represents the current $i_p$ as illustrated in FIGS. 3 and 4. The fourth and fifth waveforms 740, 750 represent the voltage $Nv_s$ and the current $i_s/N$ as illustrated in FIG. 4. One can see from FIG. 7 that the currents $i_p$, $i_s/N$ are close to zero when the power switches Q401, Q402, Q403, Q404 transition states. Combined with the voltage commutation described above, switching the power switches Q401, Q402, Q403, Q404 when the resonant current is very low considerably reduces switching losses. The voltage gain of the series-parallel resonant system will vary with load and with the resistance of the metallic coils 201, 251 (not shown in the circuit model). To regulate the output voltage, the wireless battery interface 251 operates in a burst mode of operation.

Figure 8:
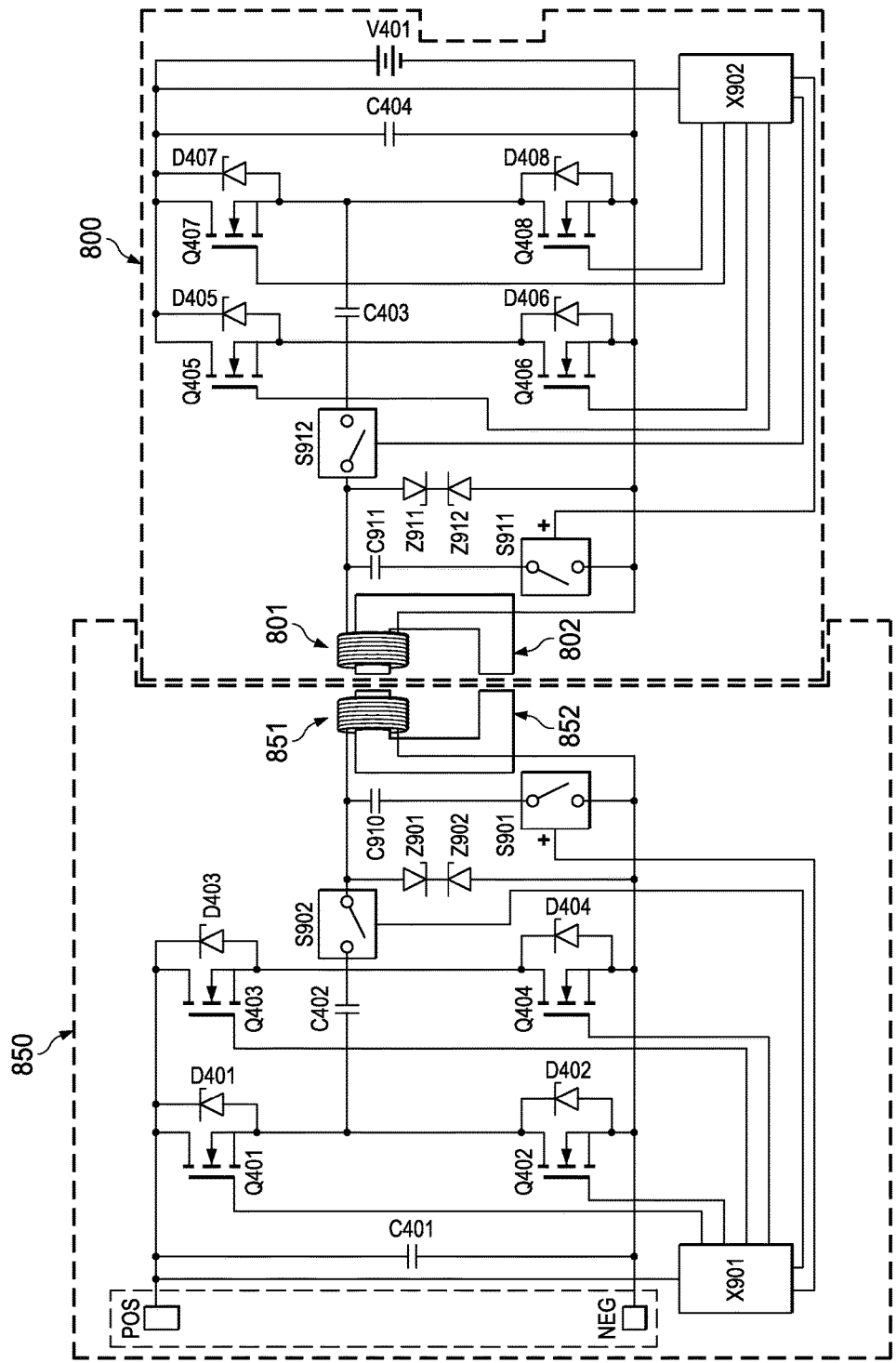
FIG. 8 illustrates a schematic diagram of an embodiment of a power system with a wireless battery and a wireless battery interface.

Turning now to FIG. 8, illustrated is a schematic diagram of an embodiment of a power system with a wireless battery 800 and a wireless battery interface 850. The wireless battery 800 is formed with a metallic coil 801 surrounding a wireless battery magnetic core piecepart 802 that can be used to both transmit and receive power. The wireless battery interface 850 is formed with a metallic coil 851 surrounding a wireless battery interface magnetic core piecepart 852 that can be used to both transmit and receive power. Analogous components for the power system illustrated in FIG. 8 to the power system illustrated in FIG. 2 will not herein be described again. The power system of FIG. 8 includes additional components and control to enable a fast regulation loop and to allow shutdown and restart of the wireless battery interface 850. The boost mode of operation prefers a fast feedback mechanism for the wireless battery interface 850 to determine when to stop transmitting power and a process to quickly wake up the wireless battery interface 850 to start transmitting power again.

Consider first the case in which the wireless battery interface 850 acts as a power transmitter and the wireless battery 800 acts as a power receiver. A switch S912 is in series with the output of the wireless battery 800 and provides a method for preventing power transfer to a resonant capacitor C403. A switch S911 in series with a capacitor C911 is in parallel with the metallic coil 801. Back-to-back Zener diodes Z911, Z912 are also in parallel with the metallic coil 801. In practice, the switch S911 can be realized using back-to-back MOSFETs or other implementations are possible. The switch S912 can also be located in a circuit leg between the anode of the Zener diode Z912 and the cathode of the diode D406. The capacitor C911 can be replaced with other impedances.

The controllers X901, X902 of the wireless battery interface 850 and wireless battery 800, respectively, operate as follows when a voltage across the capacitor C404 or a current into the battery V401 rises above a predetermined set-point such as 105 percent nominal value. Initially, the capacitor C911 is discharged. At the start of a switching cycle (representing a portion of a duty cycle of the full-bridge power train formed with the power switches Q401, Q402, Q403, Q404), the controller X902 opens the switch S912 and pulses the switch S911 closed for a fraction of a resonant switching cycle (e.g., 25 percent). After the short pulse in which the switch S911 is closed, the capacitor C911 is disconnected from the circuit and remains charged.

When the switch S911 is opened following the short pulse, and the switch S912 remains open, any energy stored in the resonant tank of the wireless battery interface 850 is dissipated in the Zener diodes Z911, Z912. Switching the capacitor C911 into the circuit causes the current in the metallic coil 851 to decrease faster than usual. The controller X901 interprets the faster fall of current in the metallic coil 851 as a signal from the wireless battery 800 and stops switching the full-bridge power train formed with the power switches Q401, Q402, Q403, Q404. The voltage across the capacitor C404 then decreases either due to leakage or battery current. When the voltage across the capacitor C404 or the current into the battery V401 drops below a predetermined level such as 95 percent of the nominal output voltage, the controller X902 closes the switch S911 and discharges the capacitor C911 through the metallic coil 801. This discharge causes a spike of voltage to appear across the metallic coil 851. The controller X902 then closes the switch S912. The controller X901 interprets the voltage spike across the metallic coil 851 as a start-up signal, so it again begins switching the full-bridge power train formed with the power switches Q401, Q402, Q403, Q404.

Thus, the power system includes the wireless battery interface 850 (with the wireless battery interface magnetic core piecepart 852) and the wireless battery 800. The wireless battery 800 includes the removable wireless battery magnetic core piecepart 802 configured to be coupled to and aligned with the wireless battery interface magnetic core piecepart 852 to form a transformer. A battery V401 of the wireless battery 800 is metallically coupled to the metallic coil 801 surrounding the wireless battery magnetic core piecepart 802 and configured to be charged and discharged through an electrically isolating path of the transformer. The power system also includes a power train including a first switching circuit (the full-bridge power train formed with the power switches Q405, Q406, Q407, Q408) of the wireless battery 800 configured to form a portion of a resonant topology with a second switching circuit (the full-bridge power train formed with the power switches Q401, Q402, Q403, Q404) of the wireless battery interface 850. The first switching circuit may be configured to be operated with a first duty cycle and the second switching circuit may be configured to be operated with a second duty cycle. The first duty cycle and the second duty cycle are controlled to enable a bidirectional power flow between the wireless battery 800 and the wireless battery interface 850 without altering the first duty cycle and the second duty cycle.

A first controller or the controller X902 in the wireless battery 800 is configured to provide a signal to couple an impedance (e.g., the capacitor C911) across the metallic coil 801 in the wireless battery 800 that advances a zero-crossing of a current in the metallic coil 851 surrounding the wireless battery interface magnetic core piecepart 852. A second controller or the controller X901 in the wireless battery interface 850 is configured to disable the second switching circuit (e.g., the full-bridge power train formed with the power switches Q401, Q402, Q403, Q404) in the wireless battery interface 850 in response to detecting the advance of the zero-crossing of current in the metallic coil 851 in the wireless battery interface 850. The controller X902 in the wireless battery 800 is configured to enable a voltage pulse to be applied across the metallic coil 801 in the wireless battery 800 that is reflected to the metallic coil 851 in the wireless battery interface 850, and the controller X901 in the wireless battery interface 850 is configured to enable operation of the second switching circuit (e.g., the full-bridge power train formed with the power switches Q401, Q402, Q403, Q404) in the wireless battery interface 850 in response to detecting the voltage pulse across the metallic coil 851 in the wireless battery interface 850. The controller X901 in the wireless battery interface 850 can operate the wireless battery interface 850 in a boost mode of operation to manage a power flow to the wireless battery 800.

Figure 9:
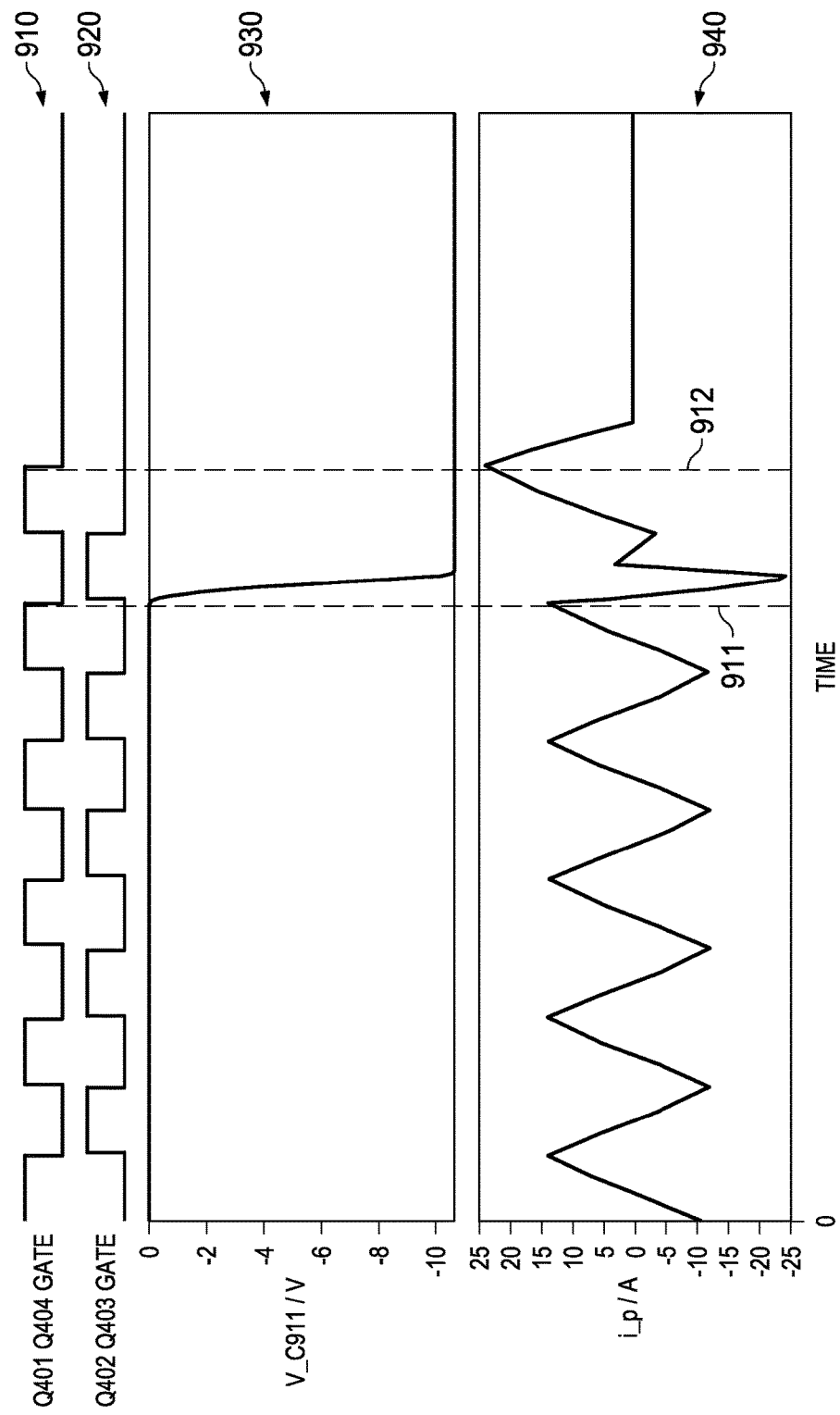
FIG. 9 illustrates a graphical representation of waveforms demonstrating an embodiment of an operation of the power system of FIG. 8.

Turning now to FIG. 9, illustrated is a graphical representation of waveforms demonstrating an embodiment of an operation of the power system of FIG. 8. The first waveform 910 in FIG. 9 represents gate drive signals for the power switches Q401, Q404. The second waveform 920 represents gate drive signals for the power switches Q402, Q403. The third waveform 930 represents the voltage $V_{C911}$ across the capacitor C911. The fourth waveform 940 represents the current $i_p$ for the wireless battery interface 850. (See, e.g., the current $i_p$ for the power system illustrated in FIGS. 3 and 4.) At a time 911, the wireless battery 800 issues a turn-off pulse by opening the switch S912 and pulsing the switch S911. Opening the switch S912 and pulsing the switch S911 effectively replaces the battery V401 with capacitor C911. Placing the capacitor C911 across the metallic coil 801 produces a resonant current therein, which is reflected to the metallic coil 851. The net effect of the resonant current through the metallic coil 801 is to advance the zero-crossing of the current $i_p$ as can be seen looking at the fourth waveform 940 in FIG. 9. At a time 912, the switching action of the power switches Q401, Q404 is terminated. Thus, the controller X902 in the wireless battery 800 is configured to enable the advance of the zero-crossing of the current through the metallic coil 851 in the wireless battery interface 850. The controller X901 in the wireless battery interface 850 is configured to disable operation of the second switching circuit (e.g., the full-bridge power train formed with the power switches Q401, Q402, Q403, Q404) in response to detecting the advance of the zero-crossing of the current through metallic coil 851 in the wireless battery interface 850.

Ideally, the pulsing of the switch S911 should be timed to allow the voltage across the capacitor C911 to resonate to a maximum value prior to opening the switch S911. To command the controller X901 to restart the power flow from the wireless battery interface 850, the switch S911 can be closed once again for a short pulse. This will cause a voltage pulse to be applied across the metallic coil 801 in the wireless battery 800 that is reflected to the metallic coil 851 in the wireless battery interface 850. The controller X901 in the wireless battery interface 850 is configured to enable operation of the full-bridge power train formed with the power switches Q401, Q402, Q403, Q404 in response to detecting the voltage pulse across the metallic coil 851 in the wireless battery interface 850.

Figure 10:
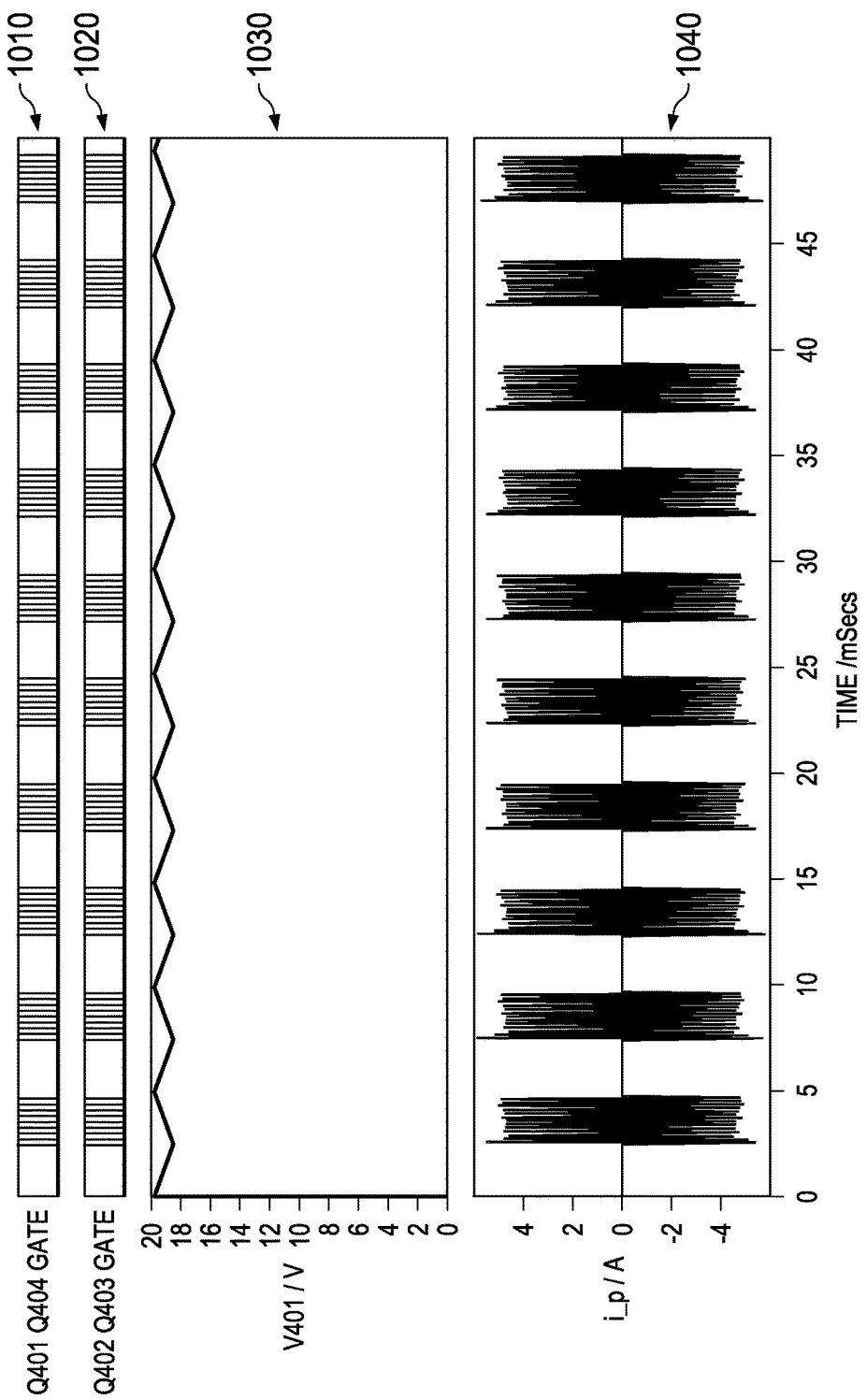
FIG. 10 illustrates a graphical representation of waveforms demonstrating an embodiment of a boost mode of operation of the power system of FIG. 8.

Turning now to FIG. 10, illustrated is a graphical representation of waveforms demonstrating an embodiment of a boost mode of operation of the power system of FIG. 8. The first waveform 1010 in FIG. 10 represents gate drive signals for the power switches Q401, Q404. The second waveform 1020 represents gate drive signals for the power switches Q402, Q403. The switching frequency of the gate drive signals (when on) is much higher than the frequency of the burst mode of operation. Thus, the individual gate drive signals appear blurred together while the full-bridge power train is operating. The third waveform 1030 represents the voltage V401 across the battery (also referred to as V401). The fourth waveform 1040 represents the current $i_p$ for the wireless battery interface 850. (See, e.g., the current $i_p$ for the power system illustrated in FIGS. 3 and 4.) Analogous to the gate drive signals, the current $i_p$ appears blurred together while the full-bridge power train is operating.

The battery voltage V401 increases when the wireless battery interface full-bridge power train is operating and decreases when the wireless battery interface full-bridge power train is off. Turn-on and turn-off voltage thresholds for the battery voltage V401 determine the amount of voltage ripple across the battery V401 and will determine the burst frequency of a burst mode of operation. Voltage thresholds that reduce the voltage ripple across the battery V401 produce a higher burst frequency. In practice, the frequency of the burst mode of operation should be designed to be lower than the switching frequency of the full-bridge power train, preferably at least two orders of magnitude lower. Otherwise, start-up and turn-off losses at the transitions of the burst mode of operation may be significant and may noticeably reduce the power conversion efficiency of the power system.

While the operation of the power system has been described above with the wireless battery interface 850 acting as a power transmitter and the wireless battery 800 acting as a power receiver, the power system may be operated in reverse. Under such circumstances, the capacitor C910, the switch S901, the Zener diodes Z901, Z902, the switch S902, and the controllers X901, X902 perform analogous functions to the corresponding parts described above when the wireless battery 800 acts as a power transmitter and the wireless battery interface 850 acts as a power receiver.

Figure 11:
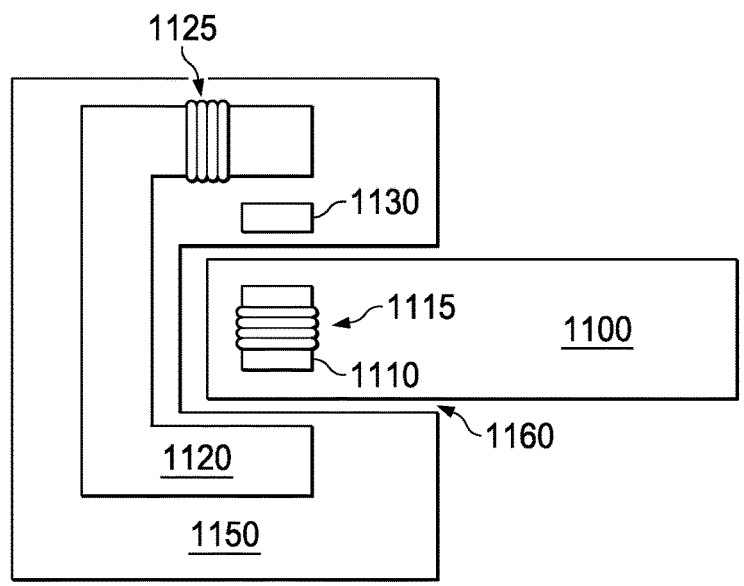
FIG. 11 illustrates a diagram of an embodiment of a magnetic device.

Turning now to FIG. 11, illustrated is a diagram of an embodiment of a magnetic device. The magnetic device includes a removable first magnetic core piecepart 1110 having a surrounding first metallic coil 1115, a second magnetic core piecepart 1120 having a surrounding second metallic coil 1125, and a third magnetic core piecepart 1130. The first, second and third magnetic core pieceparts 1110, 1120, 1130 are coupled and aligned to form a transformer. The first magnetic core piecepart 1110 may be a part of a wireless battery 1100 analogous to the wireless battery 800 illustrated in FIG. 8 and the second and third magnetic core pieceparts 1120, 1130 may be a part of a wireless battery interface 1150 analogous to the wireless battery interface 850 illustrated in FIG. 8. In accordance therewith, the magnetic device forms a coupler between the wireless battery interface 1150 and the wireless battery 1100. A cavity 1160 in the wireless battery interface 1150 is configured to receive the wireless battery 1100 and consequentially the first magnetic core piecepart 1110. The third magnetic core piecepart 1130 has a relative magnetic permeability between a relative magnetic permeability of air and the first magnetic core piecepart 1110. As an example, the relative magnetic permeability of the third magnetic core piecepart 1130 is between 4 and 100. The use of a low relative permeability in a short section (e.g., the third magnetic core piecepart 1130) of the entire magnetic path causes the overall magnetic properties of the magnetic device to become relatively insensitive to small changes in the length of the air gaps between the wireless battery 1100 and wireless battery interface 1150. Other variations of the magnetic device are possible. For example, the third magnetic core piecepart 1130 may be located in the wireless battery 1100 rather than wireless battery interface 1150. Furthermore, the third magnetic core piecepart 1130 may be embodied within or appended to a section of the first and second magnetic core pieceparts 1110, 1120.

Figure 12A:
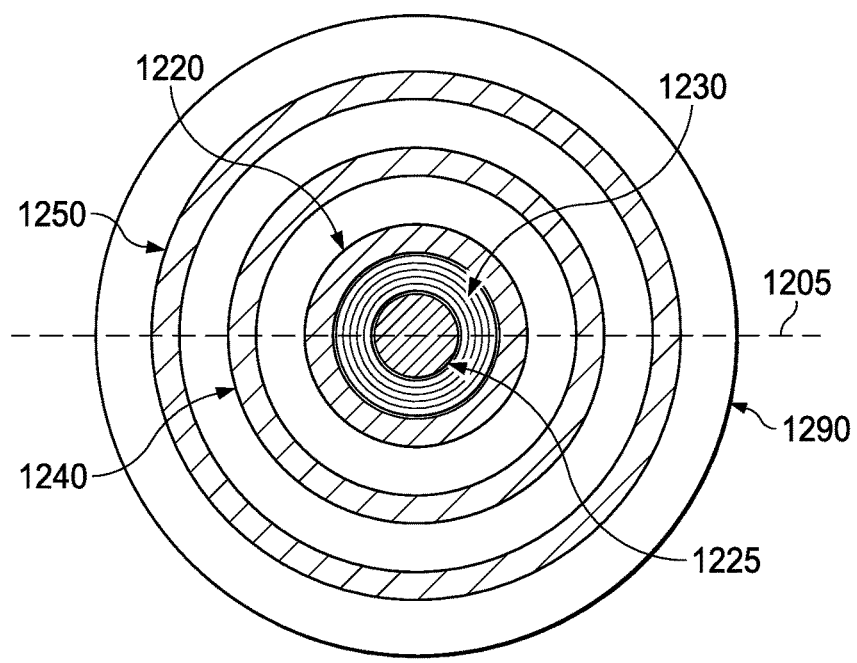
FIGS. 12A and 12B illustrate horizontal and vertical cross-sectional views, respectively, of an embodiment of a permanent magnet aligner.
Figure 12B:
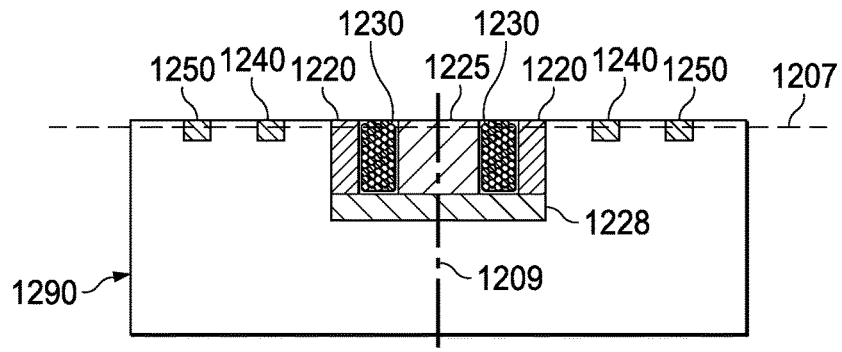

Turning now to FIGS. 12A and 12B, illustrated are horizontal and vertical cross-sectional views, respectively, of an embodiment of a permanent magnet aligner. A dotted line 1205 in FIG. 12A shows the cross-section used for FIG.

12B, and a dotted line 1207 in FIG. 12B shows the cross-section used for FIG. 12A. A wireless battery interface enclosure 1290 houses a permanent magnet aligner including magnetic rings 1240, 1250, as well as an axially symmetric magnetic coupler formed with a winding (or metallic coil) 1230 and magnetic core sections (or pieceparts) 1220, 1225, 1228. The magnetic coupler shown in FIGS. 12A and 12B is formed with a pot core, which is axially symmetric around a centerline 1209. The magnetic coupling, therefore, remains unchanged if the entire structure is rotated about the centerline 1209. Other types of magnetic cores can be used instead of a pot core, provided that the magnetic core sections are axially symmetric around an axis of alignment for the wireless battery interface and the wireless battery. The magnetic ring 1240 is oriented with a north pole against the top of the wireless battery interface enclosure 1290. The magnetic ring 1250 is also oriented with a south pole against the top of the wireless battery interface enclosure 1290.

A wireless battery enclosure (not shown) has a very similar (if not identical) structure to that shown for the wireless battery interface enclosure 1290 except that the inner and outer magnetic rings are reversed in polarity. When the wireless battery enclosure and wireless battery interface enclosure 1290 are positioned close to each other, the magnetic rings cause the magnetic couplers of the wireless battery interface enclosure 1290 and the wireless battery enclosure to align with each other.

Figure 13:
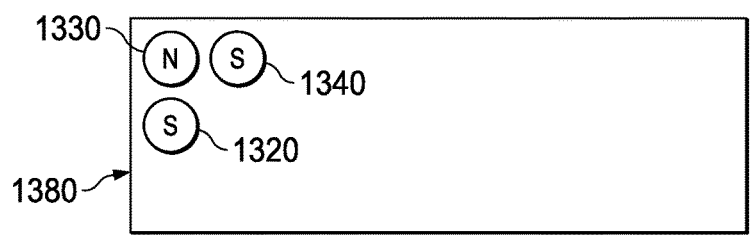
FIG. 13 illustrates a plan view of an embodiment of a permanent magnet aligner.

Turning now to FIG. 13, illustrated is a plan view of an embodiment of a permanent magnet aligner. A wireless battery interface enclosure 1380 is formed with the permanent magnet aligner including first, second and third disk-shaped magnet aligners 1320, 1330, 1340. The first and third disk-shaped magnet aligners 1320, 1340 are oriented with south poles facing against the surface of the wireless battery interface enclosure 1380. The second disk-shaped magnet aligner 1330 is oriented with a north pole facing against the surface of the wireless battery interface enclosure 1380. A wireless battery enclosure (not shown) also has a permanent magnet aligner with matching disk-shaped magnet aligners that line up with the first, second and third disk-shaped magnet aligners 1320, 1330, 1340. The matching disk-shaped magnet aligners of the wireless battery enclosure have pole arrangements opposite the corresponding first, second and third disk-shaped magnet aligners 1320, 1330, 1340 of the wireless battery interface enclosure 1380.

Other arrangements of permanent magnets can be used to align the wireless battery interface and wireless battery. The implementations illustrated in FIGS. 12A, 12B and 13 are two examples showing the concept of using permanent magnets to align the wireless battery interface and wireless battery. For example, some portions of permanent magnetic material can be replaced with iron or other ferromagnetic substances. Furthermore, permanent magnet alignment can be combined with mechanical structures to help guide the wireless battery interface and wireless battery to approximately correct positions while relying on the permanent magnets for more precise end alignment.

Figure 14:
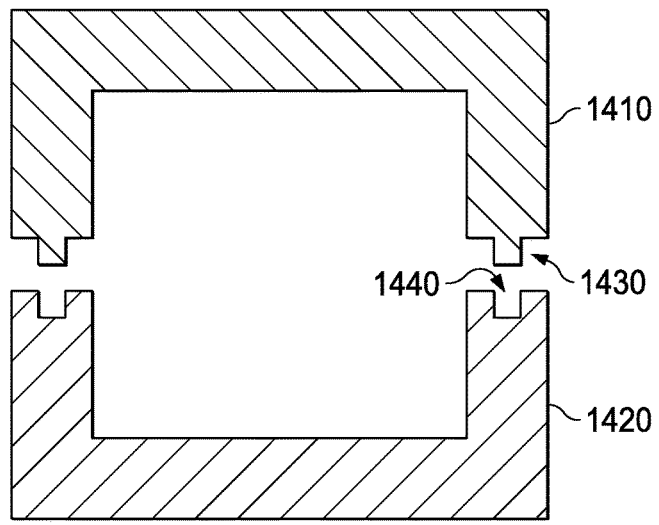
FIG. 14 illustrates a diagram of an embodiment of a portion of a magnetic device.

Turning now to FIG. 14, illustrated is a diagram of an embodiment of a portion of a magnetic device. The magnetic device (e.g., a transformer) includes an aligner configured to mechanically align a first magnetic core piecepart 1410 to a second magnetic core piecepart 1420. The aligner is formed with a first structure 1430 on the first magnetic core piecepart 1410 and a second structure 1440 on the second magnetic core piecepart 1420. While the first and second structures 1430, 1440 are illustrated as square or rectangular, any geometry or configuration including, without limitation, a circularly symmetric protuberance that is configured to fit into a corresponding circularly symmetric depression may be employed to advantage. The result is that the first magnetic core piecepart 1410 is accurately mechanically aligned with the second magnetic core piecepart 1420. In an embodiment, the mechanical coupling enables at least 90 percent of a magnetic field induced in the first magnetic core piecepart 1410 to be linked to the second magnetic core piecepart 1420.

Figure 15:
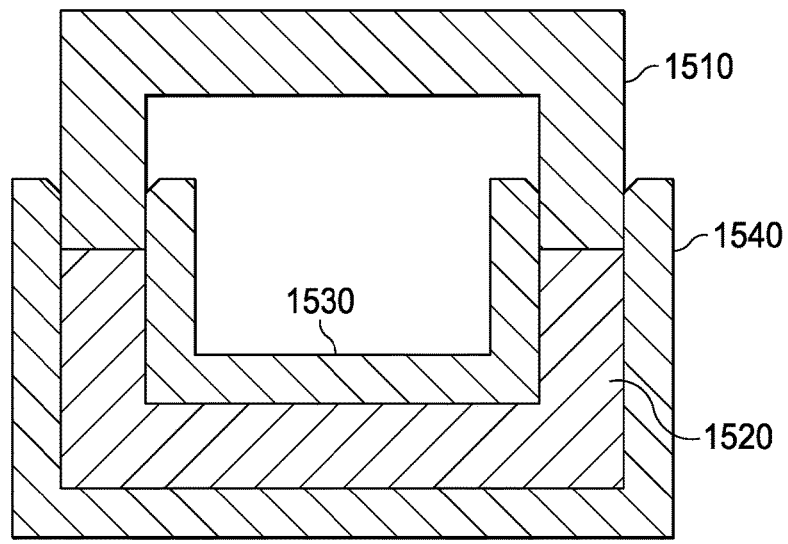
FIG. 15 illustrates a diagram of another embodiment of a portion of a magnetic device.

Turning now to FIG. 15, illustrated is a diagram of another embodiment of a portion of a magnetic device. The magnetic device (e.g., a transformer) includes an aligner configured to mechanically align a first magnetic core piecepart 1510 to a second magnetic core piecepart 1520. The aligner is formed with a first structure 1530 within the first and second magnetic core pieceparts 1510, 1520, and a second structure 1540 outside of the first and second magnetic core pieceparts 1510, 1520. The result is that the first magnetic core piecepart 1510 is accurately mechanically aligned with the second magnetic core piecepart 1520. In an embodiment, the mechanical coupling enables at least 90 percent of a magnetic field induced in the first magnetic core piecepart 1510 to be linked to the second magnetic core piecepart 1520. The first and second structures 1530, 1540 may be formed of a nonmagnetic material such as a plastic.

Figure 16:
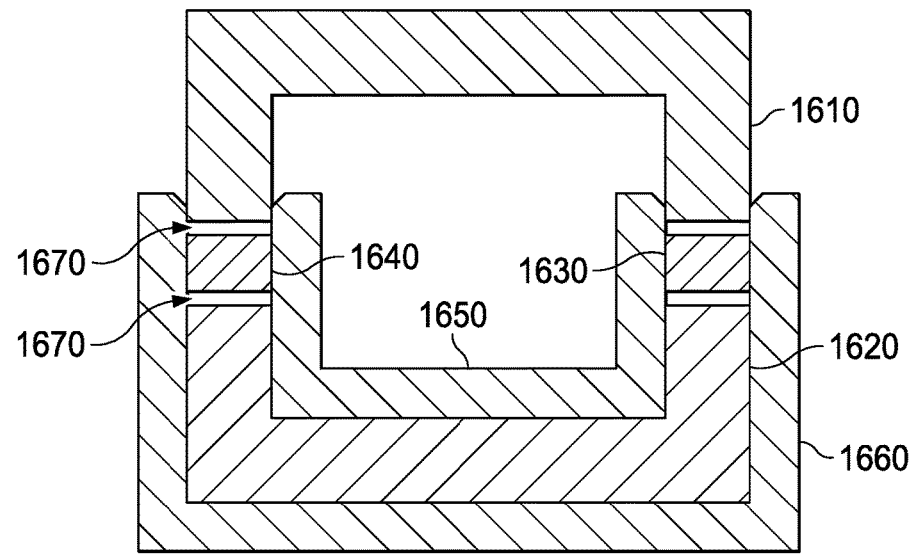
FIG. 16 illustrates a diagram of another embodiment of a portion of a magnetic device.

Turning now to FIG. 16, illustrated is a diagram of another embodiment of a portion of a magnetic device. The magnetic device (e.g., a transformer) includes an aligner configured to mechanically align a first, second, third and fourth magnetic core pieceparts 1610, 1620, 1630, 1640. The aligner is formed with a first structure 1650 within the first, second, third and fourth magnetic core pieceparts 1610, 1620, 1630, 1640, and a second structure 1660 outside of the first, second, third and fourth magnetic core pieceparts 1610, 1620, 1630, 1640. The result is that the first, second, third and fourth magnetic core pieceparts 1610, 1620, 1630, 1640 are accurately mechanically aligned. In an embodiment, the third and fourth magnetic core pieceparts 1630, 1640 have a uniform relative magnetic permeability between about 4 and 100. FIG. 16 also illustrates gaps such as gaps 1670 in the magnetic circuit path of magnetic device. The gaps 1670 include a substantially nonmagnetic material such as air or a plastic. A total length of all gaps 1670 in the magnetic circuit path of the magnetic device is typically less than about 1.5 times a square root of a cross-sectional area, for instance, of the first magnetic core piecepart 1610 perpendicular to said magnetic circuit path.

Thus, an apparatus, system and method to wirelessly charge and/or discharge a battery have been introduced herein. In one embodiment, an apparatus includes a removable first magnetic core piecepart (e.g., a wireless battery magnetic core piecepart 802 of the power system of FIG. 8) having a surrounding first metallic coil (e.g., a metallic coil 801 of the power system of FIG. 8) and configured to be coupled to and aligned with a second magnetic core piecepart (e.g., a wireless battery interface magnetic core piecepart 852 of the power system of FIG. 8) having a surrounding second metallic coil (e.g., a metallic coil 851 of the power system of FIG. 8) to form a transformer. A battery (e.g., a battery V401 of the power system of FIG. 8) is metallically coupled to the first metallic coil and configured to be charged and discharged through an electrically isolating path of the transformer.

The first magnetic core piecepart and the second magnetic core piecepart may be configured to be aligned with a permanent magnet (see, e.g., the permanent magnet aligners illustrated in FIGS. 12A, 12B and 13). The apparatus may include an aligner configured to mechanically align the first magnetic core piecepart to the second magnetic core piecepart. In accordance therewith, the first magnetic core piecepart and the second magnetic core piecepart may include a structure (e.g., the first and second structures 1430, 1440 of the magnetic device of FIG. 14) configured to mechanically align the first magnetic core piecepart to the second magnetic core piecepart. The mechanical coupling may enable at least 90 percent of a magnetic field induced in the first magnetic core piecepart to be linked to the second magnetic core piecepart. The apparatus may include a cavity (see, e.g., the magnetic device of FIG. 11) configured to receive the first magnetic core piecepart.

The apparatus may include a power train (e.g., a full-bridge power train of the power system of FIG. 8) including a first switching circuit (e.g., power switches Q405, Q406, Q407, Q408 of the power system of FIG. 8) coupled to the first metallic coil configured to form a portion of a resonant topology with a second switching circuit (e.g., power switches Q401, Q402, Q403, Q404 of the power system of FIG. 8) coupled to the second metallic coil. The power train may be intermittently operated in a burst mode of operation to control a characteristic (such as the voltage V401 illustrated in FIG. 10) of the battery. A capacitor (e.g., the resonant capacitor C402 of the power system of FIG. 8) in the power train may be selected to produce substantially zero-current switching of the first switching circuit in the power train in conjunction with an inductor (e.g., formed at least in part with the first metallic coil). The power train is also configured to enable the battery to be successively charged and discharged without changing a duty cycle of the first switching circuit and the second switching circuit.

A controller (e.g., a controller X401 of the power system of FIG. 2) of the apparatus may be configured to selectively cause at least a portion of the power train to switch between full-bridge and half-bridge operation in response to a sensed voltage level. The apparatus may also include a third magnetic core piecepart (see, e.g., the third magnetic core piecepart 1130 in the magnetic device of FIG. 11) couplable to the first and/or second magnetic core piecepart and having a relative magnetic permeability between a relative magnetic permeability of air and the first and/or second magnetic core piecepart. The relative magnetic permeability of the third magnetic core piecepart may be between 4 and 100.

Other effective alternatives will occur to a person skilled in the art. For example, the battery within the wireless battery can be replaced with a battery coupled to a battery management system. Those skilled in the art should understand that the previously described embodiments of the power system and related methods of operating the same are submitted for illustrative purposes only. In addition, various power converter topologies are well within the broad scope of the present invention. While the wireless battery interface and the wireless battery have been described in the environment of a bridge topology, it may also be applied to other systems such as, without limitation, a power amplifier and a motor controller. An example of another wireless power system is disclosed in U.S. patent application Ser. No. 14/754,915, entitled "Wireless Power System and Method of Operating the Same," by Garrity, et al., filed concurrently herewith, which is incorporated herein by reference.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. An apparatus, comprising:
   a first magnetic core piecepart having a first metallic coil encircling at least a portion thereof and configured to be coupled to, aligned with and removable from a second magnetic core piecepart having a second metallic coil encircling at least a portion thereof to form a transformer; and
   a battery metallically coupled to said first metallic coil and configured to be charged and discharged through an electrically isolating path of said transformer.

2. The apparatus as recited in claim 1 wherein said first magnetic core piecepart and said second magnetic core piecepart are configured to be aligned with a permanent magnet.

3. The apparatus as recited in claim 1 further comprising an aligner configured to mechanically align said first magnetic core piecepart to said second magnetic core piecepart.

4. The apparatus as recited in claim 1 wherein said first magnetic core piecepart and said second magnetic core piecepart comprise a structure configured to mechanically align said first magnetic core piecepart to said second magnetic core piecepart.

5. The apparatus as recited in claim 1 further comprising a cavity configured to receive said first magnetic core piecepart.

6. The apparatus as recited in claim 1 wherein a mechanical coupling enables at least 90 percent of a magnetic field induced in said first magnetic core piecepart to be linked to said second magnetic core piecepart.

7. The apparatus as recited in claim 1 further comprising a power train including a first switching circuit coupled to said first metallic coil configured to form a portion of a resonant topology with a second switching circuit coupled to said second metallic coil.

8. The apparatus as recited in claim 7 further comprising a controller configured to selectively cause at least a portion of said power train to switch between full-bridge and half-bridge operation in response to a sensed voltage level.

9. The apparatus as recited in claim 7 wherein said power train is configured to be intermittently operated in a burst mode of operation to control a characteristic of said battery.

10. The apparatus as recited in claim 7 further comprising a capacitor selected to produce substantially zero-current switching of said first switching circuit in said power train in conjunction with an inductor.

11. The apparatus as recited in claim 10 wherein said inductor is formed at least in part with said first metallic coil.

12. The apparatus as recited in claim 7 wherein said power train is configured to enable said battery to be successively charged and discharged without changing a duty cycle of said first switching circuit and said second switching circuit.

13. The apparatus as recited in claim 1 further comprising a third magnetic core piecepart having a relative magnetic permeability between a relative magnetic permeability of air and said first magnetic core piecepart and couplable to said first magnetic core piecepart or said second magnetic core piecepart.

14. The apparatus as recited in claim 13 wherein said relative magnetic permeability of said third magnetic core piecepart is between 4 and 100.

15. A system, comprising:
 a wireless battery interface including a wireless battery interface magnetic core piecepart; and
 a wireless battery, including:
  a wireless battery magnetic core piecepart configured to be coupled to, aligned with and removable from said wireless battery interface magnetic core piecepart to form a transformer; and
  a battery metallically coupled to a first metallic coil encircling at least a portion of said wireless battery magnetic core piecepart and configured to be charged and discharged through an electrically isolating path of said transformer.

16. The system as recited in claim 15 further comprising a power train including a first switching circuit of said wireless battery configured to form a portion of a resonant topology with a second switching circuit of said wireless battery interface.

17. The system as recited in claim 16 wherein said first switching circuit is configured to be operated with a first duty cycle and said second switching circuit is configured to be operated with a second duty cycle, said first duty cycle and said second duty cycle being controlled to enable a bidirectional power flow between said wireless battery and said wireless battery interface without altering said first duty cycle and said second duty cycle.

18. The system as recited in claim 16, further comprising:
 a first controller in said wireless battery configured to provide a signal to couple an impedance across said first metallic coil to advance a zero-crossing of a current in a second metallic coil encircling at least a portion of said wireless battery interface magnetic core piecepart; and
 a second controller in said wireless battery interface configured to disable said second switching circuit in response to detecting said advance of said zero-crossing of said current in said second metallic coil.

19. The system as recited in claim 18 wherein said first controller is configured to enable a voltage pulse to be applied across said first metallic coil that is reflected to said second metallic coil, and said second controller being configured to enable said second switching circuit in response to detecting said voltage pulse across said second metallic coil.

20. The system as recited in claim 18 wherein said second controller operates said wireless battery interface in a boost mode of operation to manage a power flow to said wireless battery.

* * * * *

EX PARTE REEXAMINATION CERTIFICATE (12313th)

United States Patent
Garrity et al.

(10) Number: US 9,906,067 C1
(45) Certificate Issued: Jun. 9, 2023

(54) APPARATUS, SYSTEM AND METHOD TO WIRELESSLY CHARGE/DISCHARGE A BATTERY

(71) Applicant: Garrity Power Services, LLC, Rockwall, TX (US)

(72) Inventors: Paul Garrity, Rockwall, TX (US); Aaron Jungreis, Ra'anana (IL)

(73) Assignee: Garrity Power Services, LLC

Reexamination Request:
No. 90/014,846, Aug. 30, 2021

Reexamination Certificate for:
Patent No.: 9,906,067
Issued: Feb. 27, 2018
Appl. No.: 14/754,863
Filed: Jun. 30, 2015

(51) Int. Cl.
*H02J 7/04* (2006.01)
(52) U.S. Cl.
CPC .................................... *H02J 7/04* (2013.01)

(58) Field of Classification Search
CPC .................................. H02J 7/025; H02J 7/104
See application file for complete search history.

(56) References Cited

To view the complete listing of prior art documents cited during the proceeding for Reexamination Control Number 90/014,846, please refer to the USPTO's Patent Electronic System.

*Primary Examiner* — Kenneth Whittington

(57) ABSTRACT

An apparatus, system and method to wirelessly charge and/or discharge a battery. In one embodiment, the apparatus includes a removable first magnetic core piecepart having a surrounding first metallic coil and configured to be coupled to and aligned with a second magnetic core piecepart having a surrounding second metallic coil to form a transformer. The apparatus also includes a battery metallically coupled to the first metallic coil and configured to be charged and discharged through an electrically isolating path of the transformer.

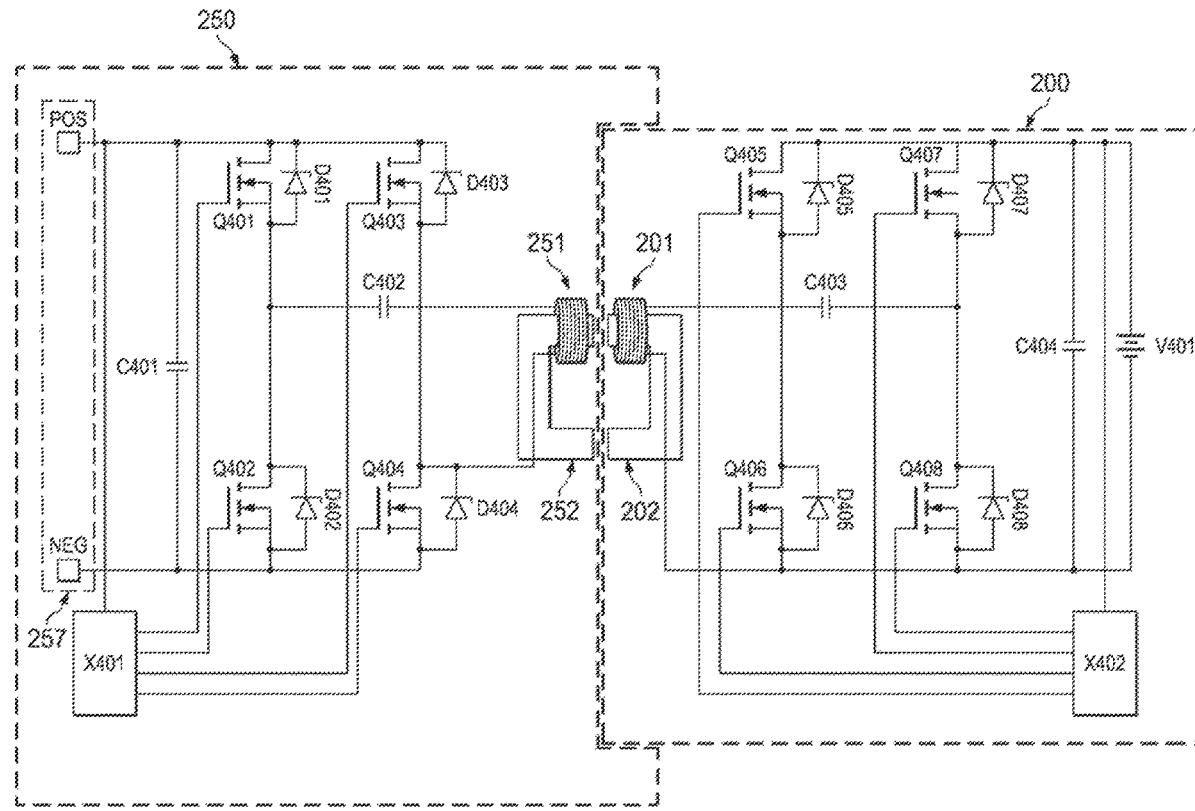

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 13, 14 and 18-20 is confirmed.

Claims 1-12 and 15-17 are cancelled.

\* \* \* \* \*